US008310600B2

(12) United States Patent
Ritchie, Jr.

(10) Patent No.: US 8,310,600 B2
(45) Date of Patent: Nov. 13, 2012

(54) SUPPLYING BROADBAND HRC NETWORKS WITH NON-HARMONICALLY RELATED CARRIERS

(76) Inventor: John Alexander Ritchie, Jr., Duluth, GA (US)

(*) Notice: Subject to any disclaimer, the term of this patent is extended or adjusted under 35 U.S.C. 154(b) by 545 days.

(21) Appl. No.: 12/569,716

(22) Filed: Sep. 29, 2009

(65) Prior Publication Data

US 2011/0075044 A1 Mar. 31, 2011

(51) Int. Cl.
 *H04N 5/40* (2006.01)
 *H04N 5/50* (2006.01)
 *H04N 7/01* (2006.01)
 *H04N 11/20* (2006.01)
(52) U.S. Cl. .................. 348/724; 348/731; 348/441
(58) Field of Classification Search .............. 348/724, 348/731
 See application file for complete search history.

(56) References Cited

U.S. PATENT DOCUMENTS

| | | | | |
|---|---|---|---|---|
| 3,898,566 A * | 8/1975 | Switzer et al. | ............... | 455/3.03 |
| 4,346,397 A * | 8/1982 | Ota | ............... | 386/232 |
| 5,828,403 A * | 10/1998 | DeRodeff et al. | ............. | 725/131 |
| 5,841,563 A * | 11/1998 | Effenberger | ................... | 348/533 |
| 6,297,858 B1 * | 10/2001 | Yang | ............... | 348/731 |
| 6,433,830 B1 * | 8/2002 | Groff et al. | .................. | 348/536 |
| 6,546,557 B1 * | 4/2003 | Ovadia | .................. | 725/129 |
| 6,567,132 B1 * | 5/2003 | Groff et al. | .................. | 348/723 |
| 7,418,240 B2 * | 8/2008 | Hsu et al. | .................. | 455/67.13 |
| 8,139,162 B2 * | 3/2012 | Blanchard et al. | ............ | 348/732 |
| 2002/0032908 A1 * | 3/2002 | Booth | ............. | 725/86 |
| 2002/0086641 A1 * | 7/2002 | Howard | .................. | 455/67.1 |
| 2003/0007572 A1 * | 1/2003 | Ohmatsu | .................. | 375/316 |
| 2004/0244048 A1 * | 12/2004 | Wada et al. | .................. | 725/120 |
| 2005/0114889 A1 * | 5/2005 | Liu et al. | .................. | 725/53 |
| 2006/0026666 A1 * | 2/2006 | Cha et al. | .................. | 725/146 |
| 2006/0141971 A1 * | 6/2006 | Howard | .................. | 455/296 |
| 2010/0220972 A1 * | 9/2010 | Bryan | .................. | 386/66 |

OTHER PUBLICATIONS

Ciciora, W., et al.; "*Modern Cable Television Technology / Video, Voice, and Data Communications*"; $2^{nd}$ Ed. Elsevier Incorporated, 2004; 33 Pgs.
CEA Standard; "*Cable Television Channel Identification Plan*"; CEA-542-C; Feb. 2009; 18 Pgs.
CEA Standard; "*RF Interface Specification for Television Receiving and Cable Television Systems*"; CEA-23-A; Dec. 2004; 36 Pgs.

* cited by examiner

*Primary Examiner* — Brian Yenke
(74) *Attorney, Agent, or Firm* — Merchant & Gould P.C.

(57) ABSTRACT

Non-harmonically related carriers may be provided for signals entering a harmonically related carrier (HRC) network. A modified carrier frequency may be assigned for any and/or all harmonics of a reference frequency. The modified carrier frequency may be computed by determining a nearest multiple of an index frequency value to the nominal harmonic frequency. The modified carrier frequency may then be used to carry video signals into the HRC network.

19 Claims, 6 Drawing Sheets

SUPPLYING BROADBAND HRC NETWORKS WITH NON-HARMONICALLY RELATED CARRIERS

FIELD OF THE INVENTION

This invention relates in general to the field of data transmission, and more particularly to the transmission of video data over non-harmonically related carriers.

BACKGROUND

Established harmonically related carrier (HRC) broadband networks may be supplied with video carriers that may avoid aeronautical frequency conflicts. Conventional systems are unable to provide multi-carrier sources, such as Digital Subscriber Access Nodes (DSAN), with frequency plans that are compatible with multiple types of established broadband networks. For example, HRC networks may require a precision master oscillator to provide harmonic lock to any carrier signals in order to minimize inter-carrier intermodulation issues. Access nodes may be remotely located from central headend facilities and may not have access to such a master oscillator. This can result in the nodes being unable to provide content to legacy HRC networks despite improvements in semiconductor quality and distortion performance that may greatly reduce the need for the intermodulation improvements of an HRC network. The problem is further complicated by Federal Communication Commission regulations that require broadband carriers occupying frequencies near aeronautical or navigation channels to offset a fixed amount from those channel frequencies to avoid interference with those channels. HRC networks have an exemption if the master oscillator is maintained at 6.0003 MHz+/−1 Hz because the harmonics fall within an allowable frequency offset region, but this accuracy requirement greatly increases the difficulty of introducing HRC frequencies into the system.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1:
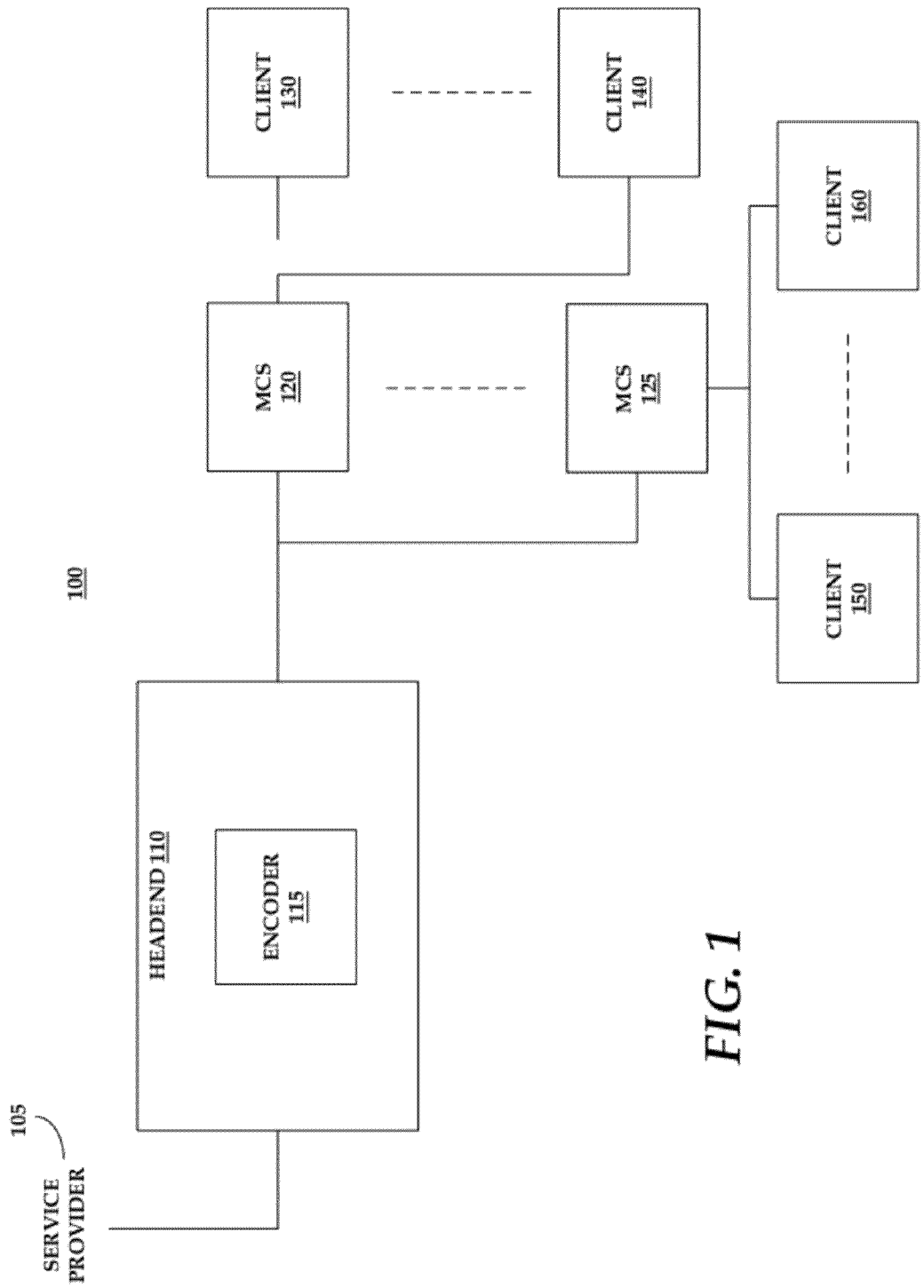
FIG. 1 is a block diagram of a cable television network.

Consistent with embodiments of the present invention, systems and methods are disclosed for supplying non-harmonically related carriers to an HRC network. Non-harmonically related carriers may be provided for signals entering a harmonically related carrier (HRC) network. A modified carrier frequency may be assigned for any and/or all harmonics of a reference frequency. The modified carrier frequency may be computed by determining a nearest multiple of an index frequency to the nominal harmonic frequency. The modified carrier frequency may then be used to carry video signals into the HRC network.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Broadband cable networks comprising harmonically related carrier (HRC) signals may be supplied with content on non-harmonically related carriers. The non-harmonically related carriers may be provided by a multi-carrier source, such as a headend, a Digital Subscriber Access Node (DSAN), and/or a mini-headend, without the need for a precision master oscillator. The non-HRC signals and may be received by unmodified HRC receivers, such as television receivers, without the need for hardware modification while remaining compliant with regulatory requirements for avoiding aeronautical radio frequency interference.

A multi-carrier source may supply carrier frequencies and/or signal components to an HRC broadband network in order to provide cable programming on standard cable television carrier frequencies. Standard HRC frequencies comprise harmonic multiples of the reference frequency of 6.0003 MHz ($f_{ref}$) and may each comprise a video carrier frequency for a television channel. According to standards propagated by the Federal Communications Commission (FCC) and the Consumer Electronics Association (CEA), cable television channels may be transmitted over carriers comprising the 9th through 166th harmonics of the reference frequency. Relevant standards may comprise CEA-23-A and 47 CFR §76. For example, channel 2 may be associated with a 9th harmonic of $f_{ref}$, or 54.027 MHz. Consistent with embodiments of the invention, the DSAN may use a modulation scheme, such as the standard proffered by the National Television System Committee (NTSC), to encode channels on a carrier frequency. Table 1, below, lists the standard HRC channel frequencies that fall within one of the aeronautical bands. The 18th and 19th harmonics are typically unused in an HRC system as those frequencies conflict almost directly with aeronautical frequencies. Channels associated with these harmonics may instead use the designated frequencies 108.025 MHz and 114.025 MHz, respectively. A more complete list of aeronautical frequencies may be found in FCC regulation 47 CFR §76.612, which is hereby incorporated by reference in its entirety.

TABLE 1

| Video Freq MHz | Harmonic of 6.0003 MHz (Video Frequency) |
|---|---|
| not allowed | 18 |
| not allowed | 19 |
| 120.0060 | 20 |
| 126.0063 | 21 |
| 132.0066 | 22 |
| 222.0111 | 37 |
| 228.0114 | 38 |
| 234.0117 | 39 |
| 240.0120 | 40 |
| 246.0123 | 41 |
| 252.0126 | 42 |
| 258.0129 | 43 |
| 264.0132 | 44 |
| 270.0135 | 45 |
| 276.0138 | 46 |
| 282.0141 | 47 |
| 288.0144 | 48 |
| 294.0147 | 49 |
| 300.0150 | 50 |
| 306.0153 | 51 |
| 312.0156 | 52 |
| 318.0159 | 53 |
| 324.0162 | 54 |
| 330.0165 | 55 |
| 336.0168 | 56 |
| 342.0171 | 57 |
| 348.0174 | 58 |
| 354.0177 | 59 |
| 360.0180 | 60 |
| 366.0183 | 61 |
| 372.0186 | 62 |
| 378.0189 | 63 |
| 384.0192 | 64 |
| 390.0195 | 65 |
| 396.0198 | 66 |

In conventional systems, a precision master oscillator may be used to ensure that the standard HRC frequencies are provided with a tolerance of +/−1 Hz., For non-harmonically related carriers, the FCC allows for a tolerance of up to +/−5 kHz. Compliance with FCC regulations requires cable television providers to offset picture carriers to a frequency away from consecutive aeronautical channels, such as a 25 kHz offset in the radio navigation bands and a 12.5 kHz offset in the communication bands. Consistent with embodiments of the invention, however, the multi-carrier source may generate carrier waves at offset frequencies from the harmonics of $f_{ref}$ in order to avoid and minimize aeronautical frequency (i.e., 108-136 and 225-400 MHz) conflicts.

FIG. 1 is a block diagram of an example environment, a cable television system 100, in which certain embodiments of an HRC broadband network may be implemented. Cable television system 100 may comprise a plurality of individual networks, such as a wireless network and/or a wired network, including wide-area networks (WANs) and local area networks (LANs), among others. The cable television system 100 may comprise a service provider 105 and a headend 110 that may receive (and/or generate) video content, audio content, and/or other content (e.g., data) sourced at least in part from service providers 105, may process and/or store the content, and may distribute the content over a communication medium, such as a hybrid-fiber coax (HFC) network. Headend 110 may comprise an encoder 115 having video compression functionality, and other content processing components (not shown). Headend 110 may distribute the content to a plurality of mini-headend distribution nodes, such as a plurality of Multi-Carrier-Sources (MCS) 120 through 125. The distribution nodes may be operative to receive and re-distribute content from a variety of sources, such as multiple headends and/or service providers to a plurality of cable subscriber clients 130 through 160.

Figure 2:
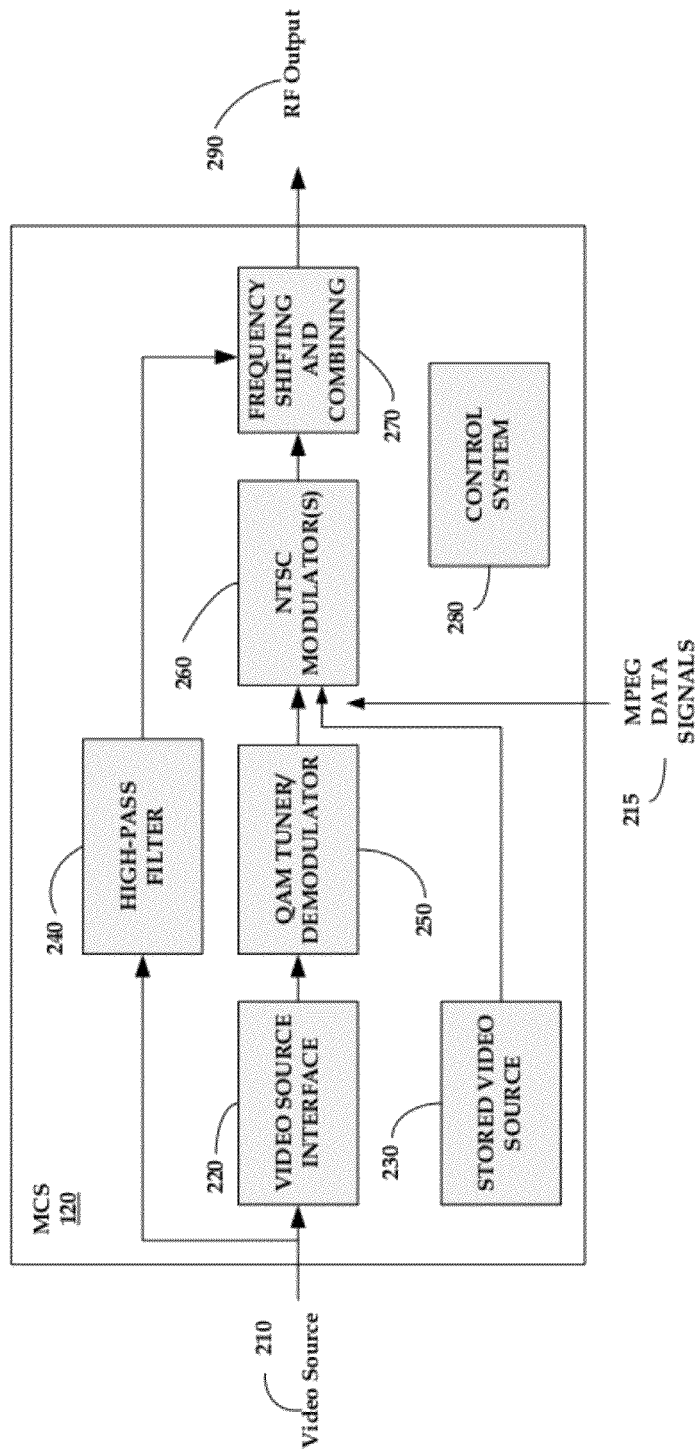
FIG. 2 is a block diagram of a multi-carrier source.

FIG. 2 is a block diagram of MCS 120. MCS 120 may receive an input 210 comprising, for example, digital broadband signals. MCS 120 may comprise a video source receiver 220, a stored video source 230 such as a volatile and/or non-volatile memory storage device, a high-pass filter 240, a demodulator 250, an NTSC modulator 260, a frequency manipulator 270, and a control system 280. MCS 120 may be operative to modulate video signals from various sources onto a carrier wave and provide a radio frequency (RF) output 290 comprising an array of NTSC modulated video carriers. Demodulator 250 may comprise, for example, a component operative to demodulate digital broadband signals transmitted using Quadrature Amplitude Modulation (QAM) and tune to a plurality of content channels carried on the broadband signals. These content channels may be converted to analog signals and modulated onto non-HRC carrier signals by NTSC modulator 260.

Input 210 may be received, for example, over a broadband cable carrying QAM signals containing MPEG video streams. Demodulator 250 may demodulate the QAM signal (s) and extract the MPEG video stream(s). The MPEG streams (up to 82 of them) may then be mapped to the desired NTSC modulators NTSC modulator 260. The video signal may then be modulated onto multiple carrier waves (e.g., via amplitude modulation). The resulting carriers may be frequency-shifted (if required) and combined into an array of video carriers in a band from 50-550 MHz where they may be output to the cable television distribution system. A portion of input 210 may be passed through to the output via high-pass filter 240. This may block the 50-550 MHz signals at input 210 from clashing with output 290 in the same 50-550 MHz frequency band. This path may allow digital QAM signals from the input pass through to the output without alteration. Control system 280 may comprise software operating instructions stored in a memory and executed by a processor such as a central processing unit or a digital signal processor.

Figure 3:
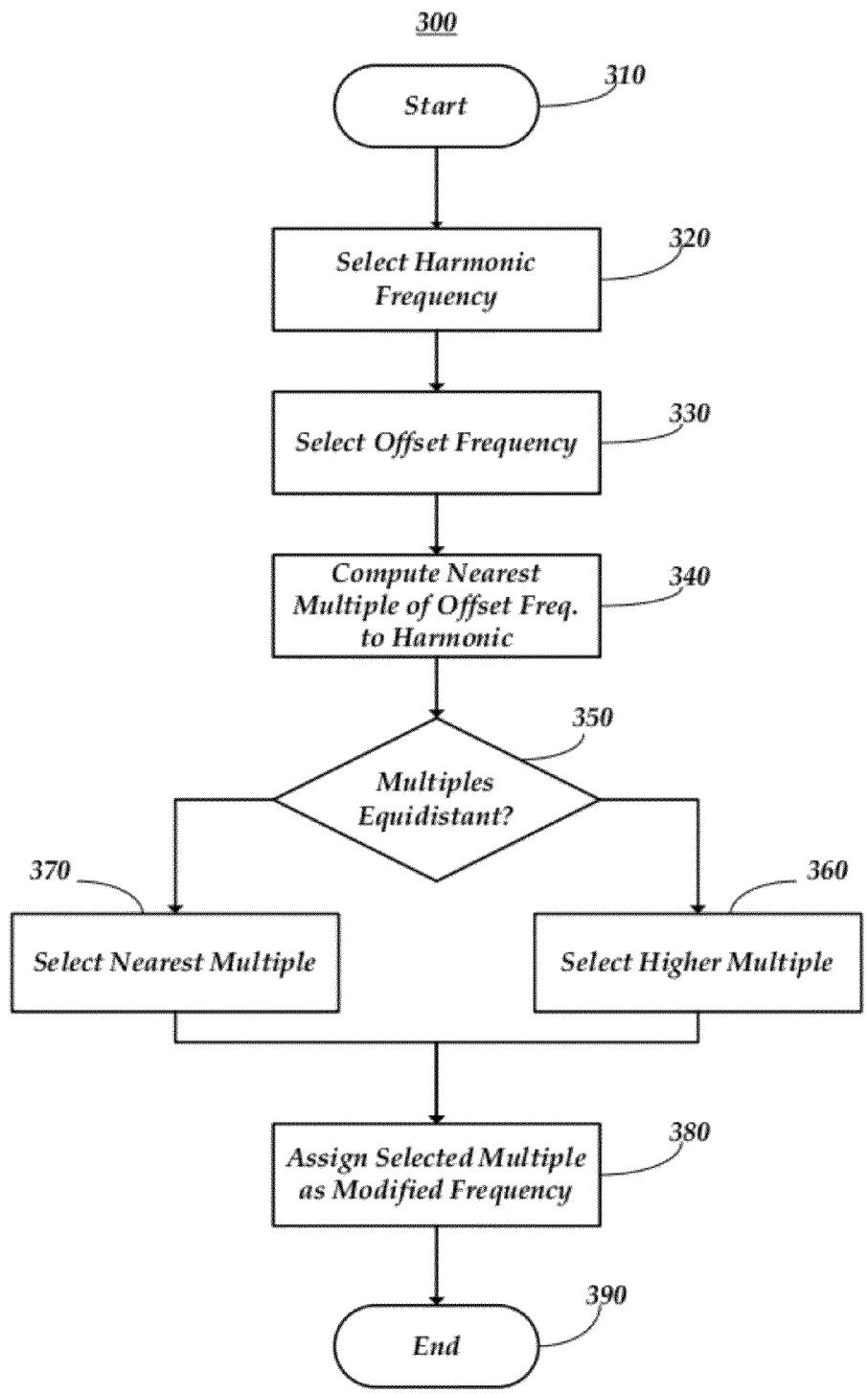
FIG. 3 is a flowchart of a method for supplying non-harmonically related carriers to an HRC network.

FIG. 3 is a flowchart setting forth the general stages involved in a method 300 consistent with embodiments of the invention for supplying non-harmonically related carriers to an HRC network. Method 300 may be implemented using a computing device 600 as described in more detail below and/or an apparatus such as MCS 120, described above. Ways to implement the stages of method 300 will be described in greater detail below. Method 300 may begin at starting block 310 and proceed to stage 320 where computing device 600 may select a harmonic frequency for assigning a modified frequency. For example, computing device 600 may select a 14th harmonic of a reference frequency. In an HRC system, the reference frequency may comprise 6.0003 MHz and the 14th harmonic would comprise 84.0042 MHz.

From stage 320, method 300 may proceed to stage 330, where computing device 600 may select an offset frequency. For example, the selected offset frequency may be comprised of a multiple of an index frequency, such as 12.5 kHz, 25 kHz, and/or 50 kHz. Consistent with embodiments of the invention, each harmonic of the reference frequency may be associated with a different offset frequency. The offset frequency may be selected to maximize separation from a restricted frequency, such as an aeronautical communications and/or an aeronautical navigational frequency.

Consistent with embodiments of the invention for supplying carriers to an HRC system, an index frequency of 12.5 kHz may be used within the aeronautical communications frequency bands 118-137 MHz, 225-328.6 MHz, and 335.4-400 MHz. Within the aeronautical radionavigation frequency bands 108-118 MHz and 328.6-335.4, an index frequency of 25 kHz may be used. Outside of the aeronautical bands, a 12.5 kHz index frequency may be used. An aeronautical offset frequency may thus comprise a frequency from the set of legitimate cable television carrier operating frequencies as offset by either 12.5 kHz or 25 kHz from aeronautical radio-communication or radionavigation frequencies described in the FCC Cable Television Frequency Separation Standards 47 CFR §76.612.

From stage 330, method 300 may advance to stage 340 where computing device 300 may compute a nearest multiple of the index frequency to the selected harmonic frequency. For example, the 14th harmonic of the HRC reference frequency of 6.0003 MHz (84.0042 MHz) does not fall within any of the aeronautical frequency bands. The index frequency of 12.5 kHz may be used, and the nearest multiple to the 14th harmonic comprises 84.0042 MHz/12.5 kHz=6720.3360, or the 6,720th multiple of 12.5 kHz. Therefore, the offset frequency comprised of the $6720^{th}$ multiple of 12.5 kHz, or 84.0000 MHz, may be used as a video carrier frequency in this example.

After computing the nearest multiple of the index frequency in stage 340, method 300 may advance to stage 350 where computing device 600 may determine whether the two nearest multiples are equidistant from each other. For example, an initial frequency may comprise 108.0250 MHz. If an index frequency of 50 kHz were used, then the computation would result in 108.0250 MHz/50 kHz=2160.5.

If, at stage 350, computing device determines that the two nearest multiples are equidistant, method 300 may advance to stage 360, where computing device 600 may select the higher multiple (e.g., 2161). Otherwise, method 300 may advance to stage 370, where computing device 600 may select the nearest multiple. For example, for the 14th harmonic as computed with an index frequency of 12.5 kHz above, computing device 600 may select 6,720 as the nearest multiple.

From either stage 360 or stage 370, where computing device 600 selected a multiple of an index frequency, method 300 may advance to stage 380 where computing device 600 may assign a modified frequency as a carrier frequency for content associated with and/or normally carried by an unmodified harmonic carrier wave of the reference frequency. For example, a frequency computed using 6720*12.5 kHz=84.000 MHz may comprise the modified carrier frequency for the 14th harmonic carrier frequency of 84.0042 MHz. Consistent with embodiments of the invention, this offset to the modified carrier frequency may remain compatible with receiving equipment designed for operation with an HRC system. That is, the tolerance of the equipment for variations in the carrier frequency for a given channel is greater than the −4.2 kHz variation from the standard, unmodified harmonic carrier frequency. After assigning the modified carrier frequency in stage 380, method 300 may end at stage 390.

Consistent with embodiments of the invention, some unmodified frequencies may be required, such as by FCC regulations, and may not be modified as described in method 300. For example, in the existing HRC system, there are two channels (the 18th and 19th multiples of 6.0003 MHz) that are prohibited because they fall directly into aeronautical navigation channels. As a result, these two channels are typically offset to 108.025 MHz and 118.025 MHz respectively to prevent interference with aeronautical services. These frequencies are already documented as part of the CEA-542-C standard. Method 300 may use these same two carriers, so the invention is congruent with the existing HRC system at these two frequencies. In these cases, the maximum frequency deviation of +19.6 kHz from the HRC comb frequency may be produced, however the deviation from the published (offset) HRC frequency will be zero.

Modified carrier frequencies predetermined by method 300 may be used by a distribution node such as MCS 120 to provide an array of RF video content signals NTSC modulated onto the modified carriers. MCS 120 may comprise a frequency generator (e.g., an oscillator and/or an analog signal generator) operative to provide a carrier wave of the modified frequency to modulator 260. The carrier signal may be generated with a +/−5 kHz tolerance and may remain within standards and guidelines of the FCC and the cable television industry.

The CEA-23-A standard RF Interface Specification for Television Receiving and Cable Television Systems (Ref 4) specifies that NTSC cable channels shall be within 25 kHz of the nominal frequencies defined in CEA-542-C. As assigned by method 300, modified frequencies may result in a worst case frequency deviation from the nominal HRC frequency of +13.5 kHz (+8.5 kHz nominal plus a +5 kHz tolerance). For example, this extreme may exist at 330.025 MHz, but for all other channels may be less than or equal to 12.3 kHz (including the 5 kHz tolerance). These deviations are discussed in greater detail below with respect to FIG. 5. Most video receivers are capable of receiving signals within this frequency offset range, and most televisions may accept up to +/−250 kHz offset without difficulty. Television receivers are generally capable of receiving carriers with an offset of at least +−10 kHz in order to accommodate the off-air co-channel frequency assignments. Broadcast stations sharing the same channel (for example Channel 2) are routinely offset at +10, 0, and −10 kHz to minimize co-channel interference between stations and are easily received by television receivers.

Figure 4:
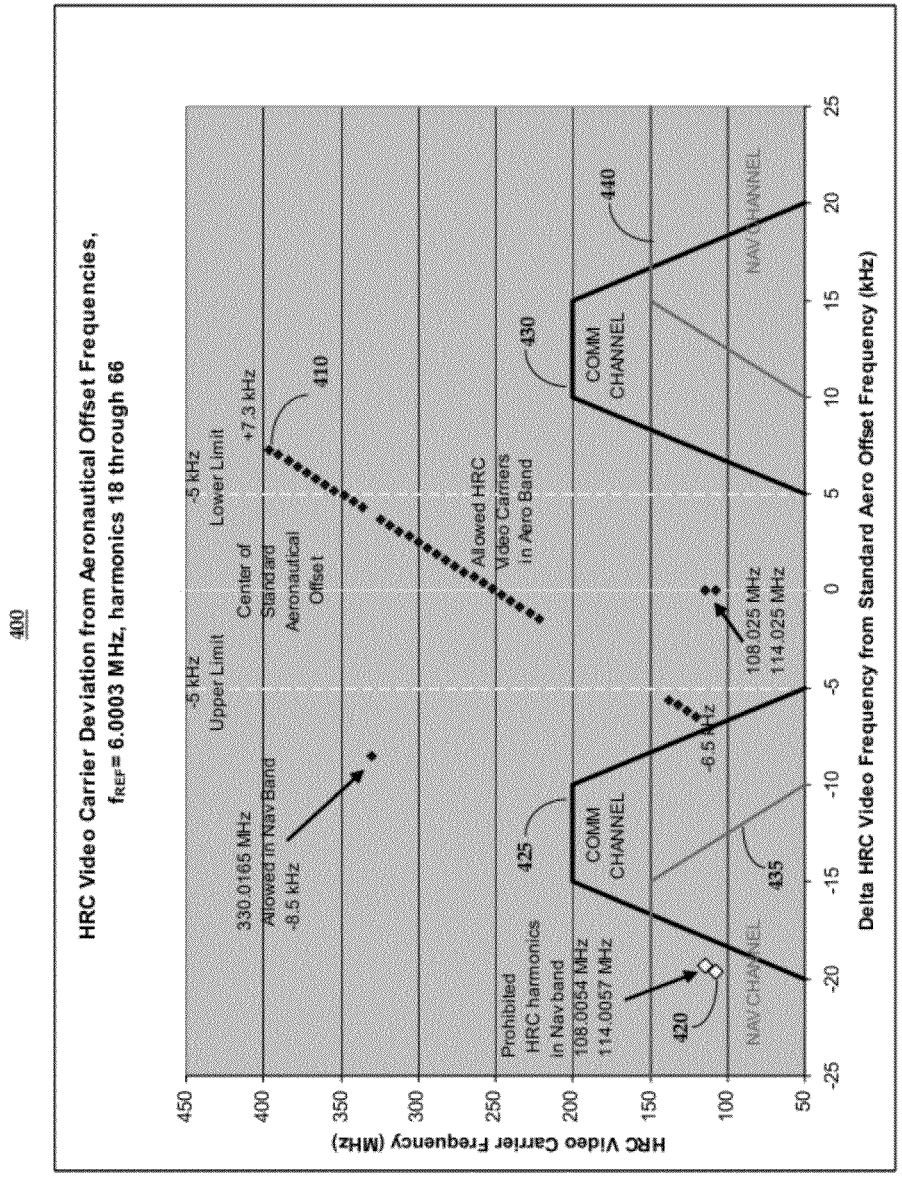
FIG. 4 is a plot of video carrier deviation from aeronautical offset frequencies.

FIG. 4 is an aeronautical offset plot 400 depicting video carrier deviation from aeronautical offset frequencies. Aeronautical offset plot 400 may comprise a plurality of allowed HRC harmonics 410, a plurality of prohibited HRC frequencies 420, a lower band 425 and an upper band 430 each representing a plurality of aeronautical communication channel frequencies, and a lower band 435 and an upper band 440 each representing a plurality of aeronautical navigation frequencies. Values of un-modified HRC harmonics 410 may be found below in Table 2.

Figure 5:
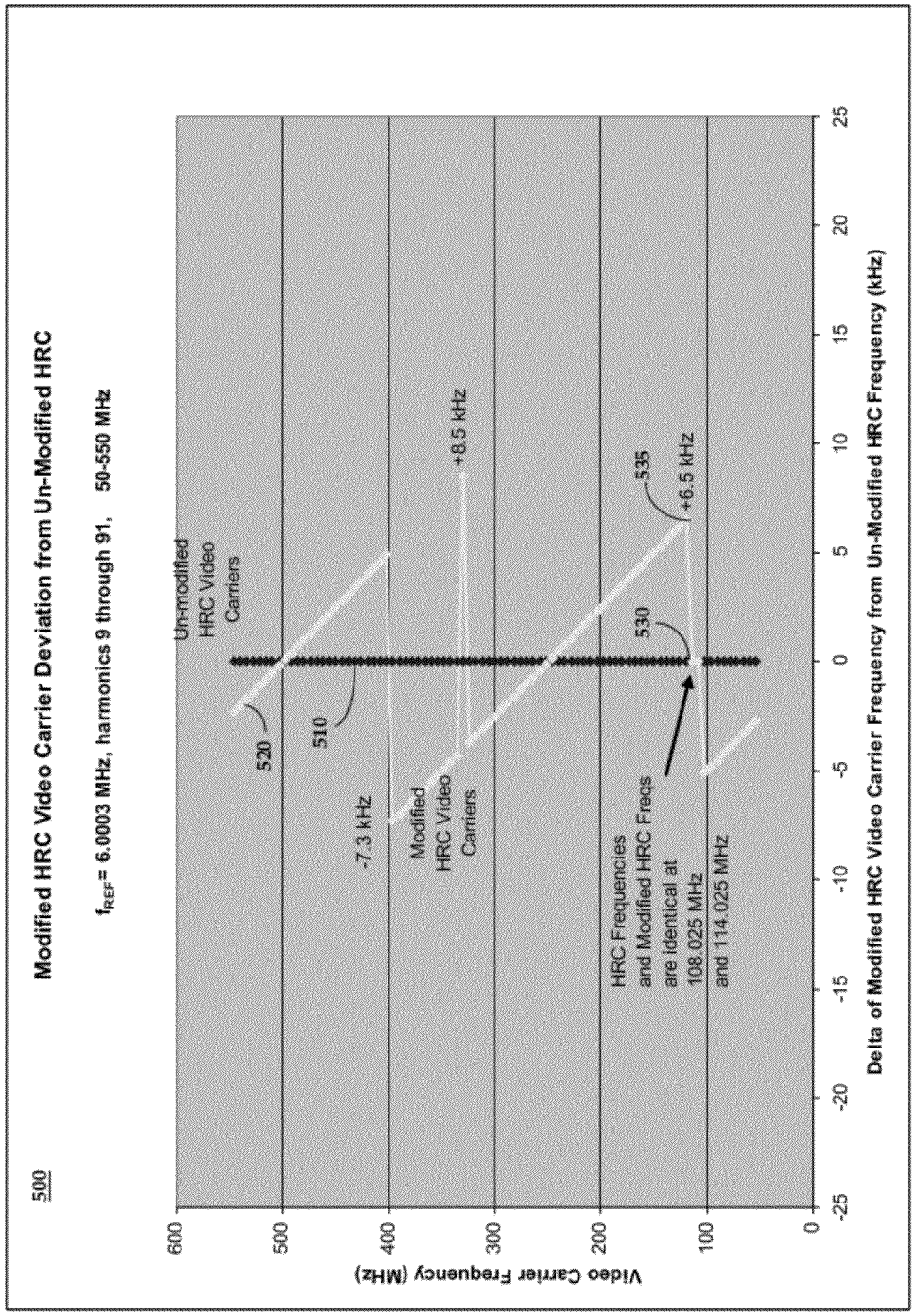
FIG. 5 is a plot of modified carrier deviations from unmodified HRC carrier frequencies.

FIG. 5 is a deviation plot 500 depicting modified carrier deviations from unmodified HRC carrier frequencies. Deviation plot 500 comprises a plurality of unmodified HRC harmonics 510 and a plurality of modified HRC frequencies 520. The values of unmodified HRC harmonics 510, the values of modified HRC frequencies 520, and a deviation amount of each modified HRC frequency from its associated unmodified HRC harmonic may be found below in Table 2. For example, the 20th harmonic of the base HRC frequency of 6.0003 MHz comprises 120.006 MHz and is plotted at a point 530. The associated modified carrier frequency of the 20th harmonic comprises 120.0125 MHz, for a deviation of +6.5 kHz, and is plotted at a point 535.

TABLE 2

| 6.0003 MHz Harmonic n | HRC Video MHz | ModHRC Video MHz | ModHRC Deviation From HRC kHz |
|---|---|---|---|
| 1 | 6.0003 | | |
| 2 | 12.0006 | | |
| 3 | 18.0009 | | |
| 4 | 24.0012 | | |

TABLE 2-continued

| 6.0003 MHz Harmonic n | HRC Video MHz | ModHRC Video MHz | ModHRC Deviation From HRC kHz |
|---|---|---|---|
| 5 | 30.0015 | | |
| 6 | 36.0018 | | |
| 7 | 42.0021 | | |
| 8 | 48.0024 | | |
| 9 | 54.0027 | 54.0000 | −2.70 |
| 10 | 60.0030 | 60.0000 | −3.00 |
| 11 | 66.0033 | 66.0000 | −3.30 |
| 12 | 72.0036 | 72.0000 | −3.60 |
| 13 | 78.0039 | 78.0000 | −3.90 |
| 14 | 84.0042 | 84.0000 | −4.20 |
| 15 | 90.0045 | 90.0000 | −4.50 |
| 16 | 96.0048 | 96.0000 | −4.80 |
| 17 | 102.0051 | 102.0000 | −5.10 |
| 18 | 108.0250 | 108.0250 | 0.00 |
| 19 | 114.0250 | 114.0250 | 0.00 |
| 20 | 120.0060 | 120.0125 | 6.50 |
| 21 | 126.0063 | 126.0125 | 6.20 |
| 22 | 132.0066 | 132.0125 | 5.90 |
| 23 | 138.0069 | 138.0125 | 5.60 |
| 24 | 144.0072 | 144.0125 | 5.30 |
| 25 | 150.0075 | 150.0125 | 5.00 |
| 26 | 156.0078 | 156.0125 | 4.70 |
| 27 | 162.0081 | 162.0125 | 4.40 |
| 28 | 168.0084 | 168.0125 | 4.10 |
| 29 | 174.0087 | 174.0125 | 3.80 |
| 30 | 180.0090 | 180.0125 | 3.50 |
| 31 | 186.0093 | 186.0125 | 3.20 |
| 32 | 192.0096 | 192.0125 | 2.90 |
| 33 | 198.0099 | 198.0125 | 2.60 |
| 34 | 204.0102 | 204.0125 | 2.30 |
| 35 | 210.0105 | 210.0125 | 2.00 |
| 36 | 216.0108 | 216.0125 | 1.70 |
| 37 | 222.0111 | 222.0125 | 1.40 |
| 38 | 228.0114 | 228.0125 | 1.10 |
| 39 | 234.0117 | 234.0125 | 0.80 |
| 40 | 240.0120 | 240.0125 | 0.50 |
| 41 | 246.0123 | 246.0125 | 0.20 |
| 42 | 252.0126 | 252.0125 | −0.10 |
| 43 | 258.0129 | 258.0125 | −0.40 |
| 44 | 264.0132 | 264.0125 | −0.70 |
| 45 | 270.0135 | 270.0125 | −1.00 |
| 46 | 276.0138 | 276.0125 | −1.30 |
| 47 | 282.0141 | 282.0125 | −1.60 |
| 48 | 288.0144 | 288.0125 | −1.90 |
| 49 | 294.0147 | 294.0125 | −2.20 |
| 50 | 300.0150 | 300.0125 | −2.50 |
| 51 | 306.0153 | 306.0125 | −2.80 |
| 52 | 312.0156 | 312.0125 | −3.10 |
| 53 | 318.0159 | 318.0125 | −3.40 |
| 54 | 324.0162 | 324.0125 | −3.70 |
| 55 | 330.0165 | 330.0250 | 8.50 |
| 56 | 336.0168 | 336.0125 | −4.30 |
| 57 | 342.0171 | 342.0125 | −4.60 |
| 58 | 348.0174 | 348.0125 | −4.90 |
| 59 | 354.0177 | 354.0125 | −5.20 |
| 60 | 360.0180 | 360.0125 | −5.50 |
| 61 | 366.0183 | 366.0125 | −5.80 |
| 62 | 372.0186 | 372.0125 | −6.10 |
| 63 | 378.0189 | 378.0125 | −6.40 |
| 64 | 384.0192 | 384.0125 | −6.70 |
| 65 | 390.0195 | 390.0125 | −7.00 |
| 66 | 396.0198 | 396.0125 | −7.30 |
| 67 | 402.0201 | 402.0250 | 4.90 |
| 68 | 408.0204 | 408.0250 | 4.60 |
| 69 | 414.0207 | 414.0250 | 4.30 |
| 70 | 420.0210 | 420.0250 | 4.00 |
| 71 | 426.0213 | 426.0250 | 3.70 |
| 72 | 432.0216 | 432.0250 | 3.40 |
| 73 | 438.0219 | 438.0250 | 3.10 |
| 74 | 444.0222 | 444.0250 | 2.80 |
| 75 | 450.0225 | 450.0250 | 2.50 |
| 76 | 456.0228 | 456.0250 | 2.20 |
| 77 | 462.0231 | 462.0250 | 1.90 |
| 78 | 468.0234 | 468.0250 | 1.60 |
| 79 | 474.0237 | 474.0250 | 1.30 |
| 80 | 480.0240 | 480.0250 | 1.00 |
| 81 | 486.0243 | 486.0250 | 0.70 |
| 82 | 492.0246 | 492.0250 | 0.40 |
| 83 | 498.0249 | 498.0250 | 0.10 |
| 84 | 504.0252 | 504.0250 | −0.20 |
| 85 | 510.0255 | 510.0250 | −0.50 |
| 86 | 516.0258 | 516.0250 | −0.80 |
| 87 | 522.0261 | 522.0250 | −1.10 |
| 88 | 528.0264 | 528.0250 | −1.40 |
| 89 | 534.0267 | 534.0250 | −1.70 |
| 90 | 540.0270 | 540.0250 | −2.00 |
| 91 | 546.0273 | 546.0250 | −2.30 |

Figure 6:
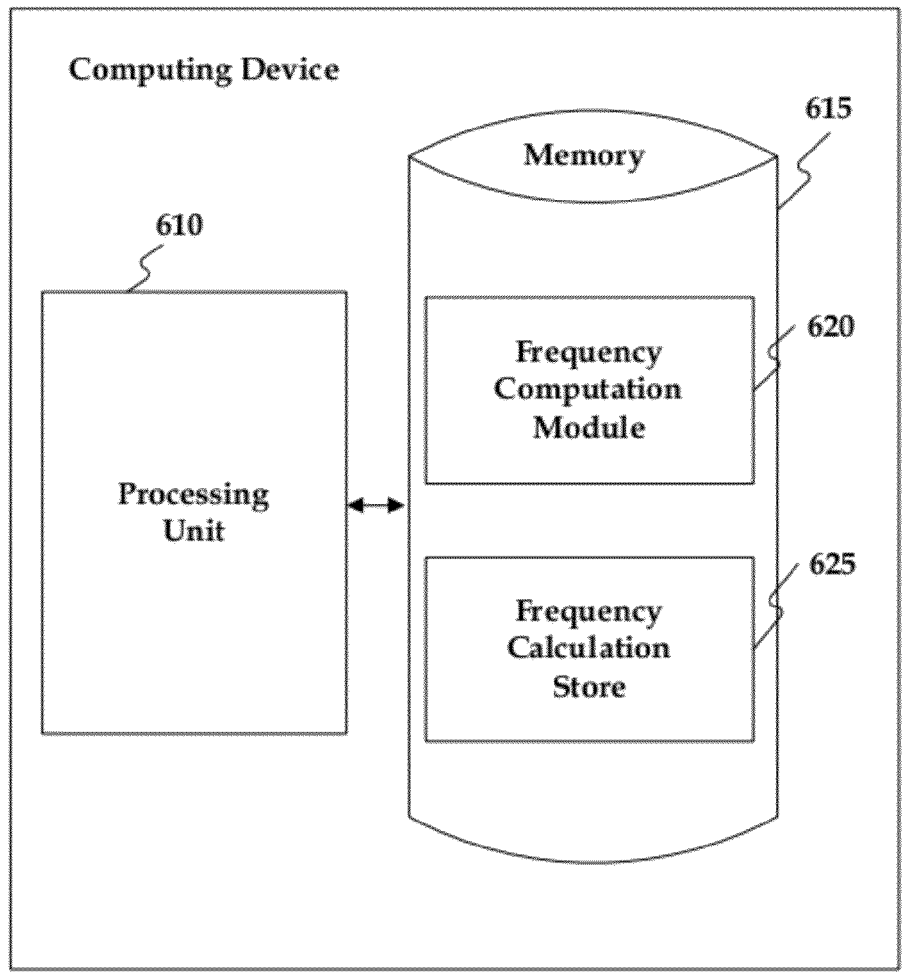
FIG. 6 is a block diagram of a computing device.

FIG. 6 shows computing device 600 in more detail. As shown in FIG. 6, computing device 600 may include a processing unit 610 and a memory storage 615. Memory 615 may include a frequency computation software module 620 and a frequency calculation store 625. While executing on processing unit 610, computation software module 620 may perform processes for calculating and/or assigning carrier frequencies offset from HRC harmonic frequencies, including, for example, one or more stages included in method 300 described above with respect to FIG. 3. Furthermore, computation software module 620 may be executed separately from the components shown in FIG. 1 and frequency calculation store 620 may be accessible from any of the components of FIG. 1. Moreover, any one or more of the stages included in method 300 may be performed on any element shown in FIG. 1.

Computing device 600 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

An embodiment consistent with the invention may comprise a system for providing modified carrier frequencies. The system may comprise a memory storage and a processing unit coupled to the memory storage. The processing unit may be operative to select a harmonic of a reference frequency, select an offset value for the harmonic, and assign a modified carrier frequency based on the offset value. The processor may further be operative to generate a carrier wave according to the assigned modified carrier frequency and modulate video content onto the carrier wave using, for example, NTSC modulation.

Another embodiment consistent with the invention may comprise a system for providing video signals to a harmonically related carrier (HRC) network. The system may comprise a memory storage and a processing unit coupled to the memory storage. The processing unit may be operative to receive a video source signal, demodulate content channels from the source signal, and generate a plurality of carrier waves, each of which may be assigned a modified carrier frequency. The system may be further operative to modulate the content channels onto the carrier waves using National Television System Committee (NTSC) modulation and output a radio frequency (RF) array of the plurality of NTSC modulated channels. The source signal may comprise, for example, digital, MPEG encoded video signals, satellite signals, and/or digital broadcast signals comprising Quadrature Amplitude Modulation (QAM) signals.

Yet another embodiment consistent with the invention may comprise a system for providing non-harmonically related carrier signals to a harmonically related carrier (HRC) network. The system may comprise a video source supplying a source signal to a processor coupled to a memory storage. The processing unit may be operative to receive video content from the video source, modulate the content onto a carrier frequency comprising a predetermined frequency assigned to maximize a separation from at least one restricted aeronautical frequency, and output the modulated video content channel.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing modified carrier frequencies, the method comprising:
   selecting a harmonic of a reference frequency;
   selecting an offset frequency value for the harmonic of the reference frequency;
   assigning a modified carrier frequency based on the offset frequency value to content associated with the harmonic of the reference frequency;
   generating a carrier wave according to the assigned modified carrier frequency;
   modulating a received video signal onto the carrier wave, wherein the modified carrier frequency comprises a predetermined separation from at least one restricted frequency; and
   transmitting the modulated carrier wave onto a harmonically related carrier (HRC) network.

2. The method of claim 1, wherein the reference frequency comprises 6.0003 MHz.

3. The method of claim 1, wherein the carrier wave comprises a carrier wave for a cable television signal.

4. The method of claim 3, wherein modulating the received video signal onto the carrier wave comprises modulating the carrier wave with a cable television signal using a National Television System Committee (NTSC) standard.

5. The method of claim 1, further comprising:
   determining whether the harmonic of the reference frequency comprises a required frequency; and
   in response to determining that the harmonic of the reference frequency comprises a required frequency, generating the carrier wave at the required frequency.

6. The method of claim 1, wherein the modified carrier frequency comprises a nearest multiple of an index frequency value to the harmonic of the reference frequency.

7. The method of claim 6, wherein the index frequency value comprises at least one of the following: 12.5 kHz, 25 kHz, and 50 kHz.

8. The method of claim 6, further comprising:
   determining whether two multiples of the index frequency value are equidistant from the harmonic of the reference frequency; and
   in response to determining that two multiples of the index frequency value are equidistant from the harmonic of the reference frequency, assigning the higher multiple of the index frequency value as the modified carrier frequency.

9. The method of claim 1, wherein the at least one restricted frequency comprises at least one of the following: an aeronautical communication frequency and an aeronautical navigation frequency.

10. The method of claim 1, wherein the carrier wave is generated with a tolerance of +/−5 kHz.

11. The method of claim 1, wherein the carrier wave comprises a frequency within a tolerance for a Harmonically Related Carrier compatible signal receiver.

12. An apparatus for providing video signals to a harmonically related carrier (HRC) network, the apparatus comprising:
   a signal input operative to receive a video source signal, wherein the video source signal comprises a plurality of modulated content channels;
   a demodulator operative to demodulate the plurality of modulated content channels;
   a frequency generator operative to generate a plurality of carrier waves, each of the carrier waves assigned one of a plurality of modified carrier frequencies wherein the plurality of modified carrier frequencies each comprise a predetermined offset from a harmonic of a reference frequency, and wherein the modified carrier frequency comprises a predetermined separation from at least one restricted frequency; and
   transmitting the modulated carrier wave onto a harmonically related carrier (HRC) network;
   a modulator operative to modulate the plurality of content channels onto the plurality of carrier waves using National Television System Committee (NTSC) modulation; and a signal output operative to provide a radio frequency (RF) output of the plurality of NTSC modulated channels to a harmonically related carrier (HRC) network.

13. The apparatus of claim 12, wherein the video signal comprises a digital signal wherein video data is modulated on a carrier frequency using Quadrature Amplitude Modulation (QAM).

14. The apparatus of claim 12, wherein the reference frequency comprises 6.0003 MHz.

15. The apparatus of claim 12, wherein the predetermined offset from the harmonic of the reference frequency is assigned by computing a nearest multiple of an index frequency value.

16. The apparatus of claim 15, wherein the index frequency value comprises at least one of the following: 12.5 kHz, 25 kHz, and 50 kHz.

17. A system for providing non-harmonically related carrier signals to a harmonically related carrier (HRC) network, the system comprising:
- at least one video source comprising at least one of the following: a digital source signal input and a memory comprising a stored video source;
- a memory storage; and
- a processor coupled to the memory storage, wherein the processor is operative to:
  - receive at least one video content channel from the at least one video source,
  - modulate the at least one video content channel onto a carrier frequency, wherein the carrier frequency comprises a predetermined frequency assigned to maximize a separation from at least one restricted aeronautical frequency and wherein the predetermined frequency comprises a predetermined offset from at least one standard HRC harmonic frequency, and
  - output the video content channel modulated onto the carrier frequency.

18. The system of claim 17, wherein the offset is assigned by computing a nearest multiple of an index frequency value to the standard HRC harmonic frequency.

19. The system of claim 18, wherein the index frequency value comprises at least one of the following: 12.5 kHz, 25 kHz, and 50 kHz.

* * * * *